United States Patent [19]

Ronayne

[11] 4,269,586
[45] May 26, 1981

[54] HEATED PLATEN
[75] Inventor: James F. Ronayne, Fishkill, N.Y.
[73] Assignee: Norfield Corporation, Danbury, Conn.
[21] Appl. No.: 115,337
[22] Filed: Jan. 25, 1980
[51] Int. Cl.³ .............................................. B29C 5/00
[52] U.S. Cl. .................... 425/407; 425/384; 425/445; 425/817 R; 249/79; 249/141
[58] Field of Search ............... 425/214, 233, 236, 406, 425/407, 408, 409, 411, 451.9, 495, 384, 810, 812, 394, 817, 577; 249/141, 79; 264/164

[56] References Cited

U.S. PATENT DOCUMENTS

| | | | |
|---|---|---|---|
| Re. 15,608 | 5/1923 | Burroughs | 425/810 X |
| 2,613,395 | 10/1952 | Massler | 425/810 |
| 2,976,571 | 3/1961 | Moslo | 425/812 |
| 3,358,061 | 12/1967 | Gidge et al. | 425/812 |
| 3,577,843 | 5/1971 | Kutik et al. | 425/577 X |
| 3,765,810 | 10/1973 | Smarook | 425/394 X |
| 3,830,459 | 8/1974 | Straufeld | 425/407 X |
| 3,854,852 | 12/1974 | Carter | 425/812 |
| 3,871,811 | 3/1975 | Barry et al. | 425/407 |
| 4,003,687 | 1/1977 | Hedin | 425/406 |
| 4,113,909 | 9/1978 | Beasley | 264/164 X |

FOREIGN PATENT DOCUMENTS 1256005  2/1961  France .................... 249/141

*Primary Examiner*—J. Howard Flint, Jr.
*Attorney, Agent, or Firm*—Kenyon & Kenyon

[57] ABSTRACT

A platen capable of being heated is disclosed wherein fluid flow zones containing heat exchange channels are individually sealed. The heat exchange channels in the platen are connected by a connecting channel sized so that the distance from the connecting channel to a vent passage or a vented opening in the platen is not less than the distance from the vent passage or vented opening to the heat exchange channel. The sealing of the fluid flow zones is accomplished with plugs and end plates which are welded to the platen and then welded together with a fillet weld.

17 Claims, 5 Drawing Figures

HEATED PLATEN

BACKGROUND OF THE INVENTION

This invention relates to heated platens in general and more particularly to an improved heated platen less subject to leaks. Heated platens are used for various functions such as for example the expansion of thermo formable material. Typically platens of this nature are made of aluminum and contain within them a plurality of parallel channels through which a heat exchange fluid may be passed in order to heat the platen. In large platens, the heat exchange passages are divided up into zones so that all areas of the platen are equally heated, otherwise the fluid, by the time it went from end of the platen to the other, would be considerably cooled and there would be uneven heating.

One type of heated platen that is of particular interest if a platen used in carrying out the expansion of a thermoformable material using a process such as that described in U.S. Pat. No. 3,765,810 and as also described in U.S. Pat. No. 4,113,909 granted to Donald R. Beasly and assigned to the Norfield Corporation, the same assignee as the present invention. In the process disclosed therein, a thermoformable plastic material is disposed between two platens, each of the platens having a surface containing a large number of vented openings. The platens are heated to a temperature of equal to or greater than 70° C. at which point the thermoformable material bonds by hot tack adhesion to the platens at areas other than those containing openings. The platens are moved apart and venting occurs at the openings. Thus, as the platens are pulled apart a cellular structure results as more fully disclosed in the aforementioned patents. The platens are then cooled whereupon the expanded material can be removed from between the platens.

The type of platens which have been used commercially for this purpose contain a plurality of circular holes all of which are vented, the holes being arranged in rows and columns which are staggered. The aforementioned U.S. Pat. No. 4,113,909 describes the manner in which such platens can be supported so as to maintain a planar surface. Although the method and apparatus described therein has been used in commercial applications to produce large panels of for example 4×8 feet, various problems have occured with platens.

At the vented openings, vent passages have been previously drilled through the platens in a direction perpendicular to the plane surface of the platen. Only small holes can be used so as to avoid running into the channels traversing the platen which contain the heat exchange fluid. Because of the small diameter of the vent passages and the materials used in the process, the vent passages tended to become clogged. A further problem with platens containing perpendicularly disposed vent passages with apertures on the top surface of the platens, is that cracks have formed in the area between the heat exchange channel and the holes. Such cracks are not accessible from the exterior of the platens, as are cracks which might occur in the bottom of the platen. Thus, the occurance of such cracks, may mean that the whole platen has to be scrapped and a new one made, since remedial measures such as welding are not possible.

A further problem has been that of leaks, in particular leaks at the edges of the platens and also at the top or bottom of the platen. In the previously used platens a plurality of bores are formed extending across the width of the platen parallel to each other for the induction of the heat exchange fluid. These are divided up into zones with five bores or channels forming a zone. The heat exchange fluid is supplied, from below to the first of these channels at one side of the platen. It is removed from the fifth channel at the other side of the platen. In order to permit a back and forth flow, the ends of the platens were milled between bores to form a continuous flow channel. Upon completion of milling, an end plate was placed over the ends of the continuous flow channels and welded to the sides of the platen to cover up the exposed channels, thereby forming closed flow paths. Thus, one end plate covered the various zones on the side of the platen. In practice, a number of problems have resulted. First, cracks have developed at the end plate, or between the end plate and the platen, resulting in leaks. Furthermore, seepage of the heat exchange fluid from one zone to another has occurred reducing its effectiveness. These problems are found not only in platens used in an expansion process as described above but in other heated platens, particularly aluminum platens subjected to thermal shock.

It is the object of the present invention to provide a platen which avoids the problems of leakage at the end plates, including leakage to the outside and leakage from one zone to the other.

It is a further object of the present invention to avoid, in a platen containing a plurality of vent passages in its surface, cracking in the area of the vent passages.

In accordance with the present invention, the first object noted above, is achieved by utilizing separate end plates for each zone, which end plates are welded in place over a respective zone. This gives a number of advantages, in particular, it prevents the possibility of leakage from zone to zone. More significantly, however, by using a plurality of smaller end plates it avoids large stresses which are present when a single continuous end plate is used, reducing the possibility of cracks. In accordance with the present invention, it is preferred that the bore containing the inlet on one side of a particular zone not be covered by the plate, but rather have inserted therein a plug which is then welded to the platen. An end plate is then placed over the four remaining bores, after connecting channels have been milled between adjacent bores. Finally, adjacent plates and the welded plug are welded with a fillet weld to further strengthen and seal the arrangement.

In a plate of the type containing horizontal vent passages in its surface, in order to avoid cracks near that surface, the milled connecting channel between adjacent bores, or heat exchange fluid channels is milled such that its boundary is no closer to any openings, in particular to vent passages or vented openings than are heat exchange channels extending across the platen. What this means is that, rather than milling a channel having the same width as a diameter of the transfers heat exchange fluid channels, a connecting channel with a lesser width and greater depth is milled at the side of the channels furthest from the vented openings. In this way, the distance from any vent passage to the continuous flow channel is increased so that there is a greater amount of metal present, thereby materially decreasing the chance of cracks.

DETAILED DESCRIPTION OF THE INVENTION

Figure 1:
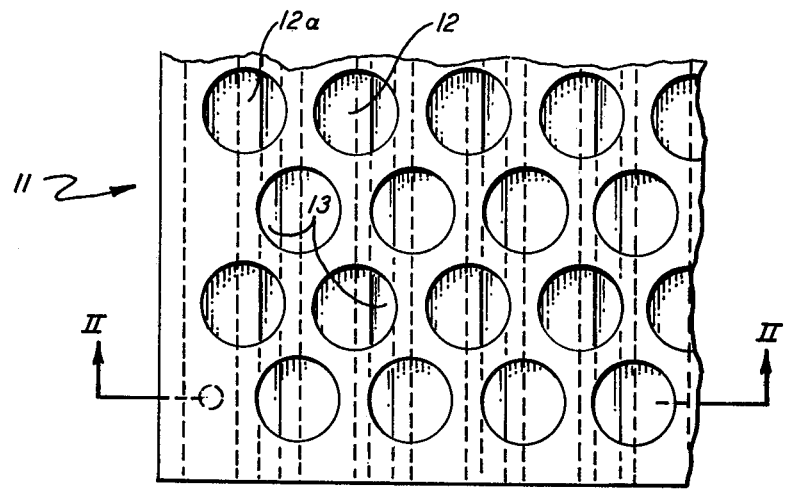
FIG. 1 is a plan view of a portion of a platen utilized for carrying out the expansion of thermoformable material.
Figure 2:
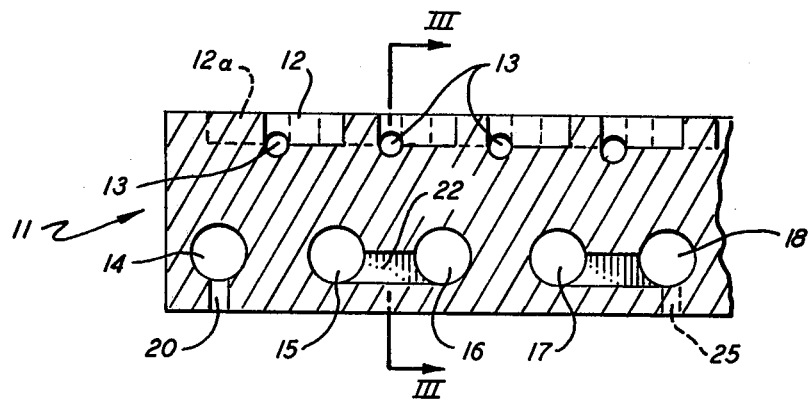
FIG. 2 is a longitudinal cross section through the platen of FIG. 1.

As illustrated by FIG. 1, a platen 11, typically one and three quarter inches thick, is provided for use in a process for expanding thermoformable material, as described in the aforementioned patents. In the plan view of FIG. 1 only a few of the vented openings 12 and 12a are shown. Typically in the platen used for making expanded panels of 5×10 feet there would be 9,125 vented openings. These vented openings are arranged in rows and columns on staggered 1 inch centers, with each of the holes having a diameter of ¾ of an inch and being 0.375 inches deep. Referring to the sectional view of FIG. 2 one of the vented openings 12 is visible as is a vented opening 12a in an adjacent column which is hidden in this view. At approximately the depth of the holes a plurality of vent passages 13 are bored across the width of the platen. Each vent passage 13 is located so as to intersect both the row of holes containing the vented openings 12 and the row containing the vented openings 12a, thereby venting two sets of vented openings in a single vent passage 13.

A plurality of heat exchange channels 14, 15, 16, 17 and 18 are bored across the width of the platen 11, on a plane parallel to a plane defined by the vent passages 13 but disposed below and offset from the vent passages 13. The heat exchange channels 14 through 18 are used to contain a flow of heated or cooled fluid. Because of the parallel disposition of the vent passages 13 and the heat exchange channel 14, 15, 16, 17, and 18, the volume of venting provided by the vent passages 13 can be increased without interfering with the heat exchange channels. Also the arrangement wherein the vent passage 13 is put in communication with the plurality of vented openings 12 and 12a provides a savings in manufacturing costs, and facilitates the cleaning of the vent passages 13. As noted, this method of venting has been found greatly superior to the prior art method in which an additional pilot hole was extended through the thickness plate. This method of venting is not as susceptible to clogging by errant particles. The method also allows for greater venting volume since the vent passages do not interfere with the fluid flow channel.

Directly below the vented openings 12 and 12a are the heat exchange channels 14–18 which extend across the platen 11. As previously noted, each fluid flow zone includes five heat exchange channels. Heat exchange fluid is supplied from a manifold through a inflow pipe 20 to one end of the heat exchange channel 14. The heat exchange fluid flows through the channel 14 in a direction away from the observer. It then flows through a milled connecting channel 22 shown in cross section in FIG. 3 and into heat exchange channel 15 in a direction towards from the observer.

Figure 3:
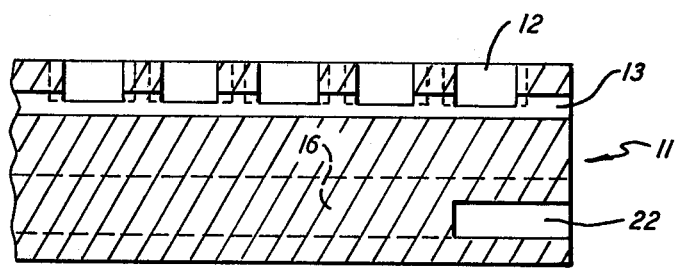
FIG. 3 is a transfer cross section through the platen of FIG. 2.

Sizing of the milled connecting channel 22 used in conjunction with vent passages parallel to heat exchange channels is an important feature of this invention. Specifically, rather than having the milled connecting channel 22 with a diameter equal to that of the heat exchange channel 14, the width of the milled channel 15 smaller, as shown in FIG. 3. For example, in the illustrated embodiment, the milled connecting channel 22 has a width of only 7/16 inches and a depth of approximately 1 inch. In this manner the distance from the milled connecting channel 22 to the vent passage 13 is maintained at least as great as the distance from the vent passage 13 to the periphery of the heat exchange channel 14. If the milled connecting channel 22 was extended directly across and had the same width as the diameter of the heat exchange channel 14 and 15, then there would be a relatively shorter distance between its top surface and the vent passage 13 and then there would be a greater danger of cracks. Through this measure, the present invention thus provides a more reliable platen. Typically, in a platen which is one and three quarter inches (1¾″) thick, the minimum distance to be maintained between the vent passages 13 and the milled connecting channels 22 is approximately 0.490 inches.

Fluid flows away from the observer in the heat exchange channel 14, through another milled connecting channel and back toward the observer again through a heat exchange channel 15, then through a milled connecting channel 22, and back through another heat exchange channel. The direction of flow is shown by arrows in FIG. 4. At the far end of heat exchange channel 18 (not shown on FIG. 4), the fluid is removed to a manifold through an outflow conduit 25. Typically there are two milled connecting channels 22 on each side of the platen for each zone.

In the prior art the typical practice was to place a single end plate over each side of the platen covering the heat exchange channels 14, 15, 16, 17 and 18 along with the milled connecting channels 22 for each of the adjacent zones. With such an arrangement cracks tended to develop and seepage of fluid, for example, from a channel 15 to channel 16, resulted. This is not desirable since the fluid in the channel 15 has given up its heat and is now relatively cool. The mixing of such fluid with the hot fluid in the channel 16 could substantially reduce it overall temperature and cause uneven heating of the platen. Furthermore, cracks developing at a plate welded over the heat exchange channels could result in loss of heat exchange fluid which is relatively expensive and the expense of shut down and repair.

Figure 4:
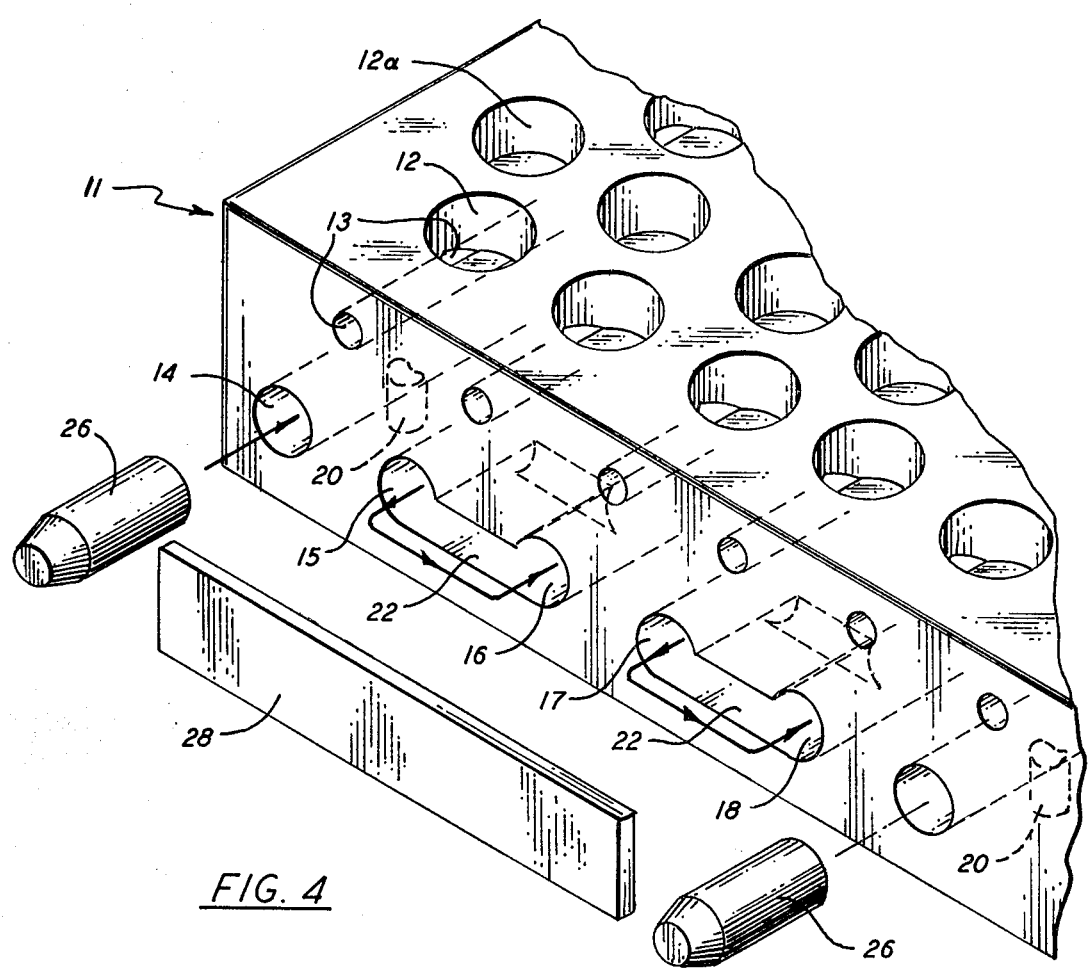
FIG. 4 is an end-view of the platen showing the placement of the end plates and plugs.
Figure 5:
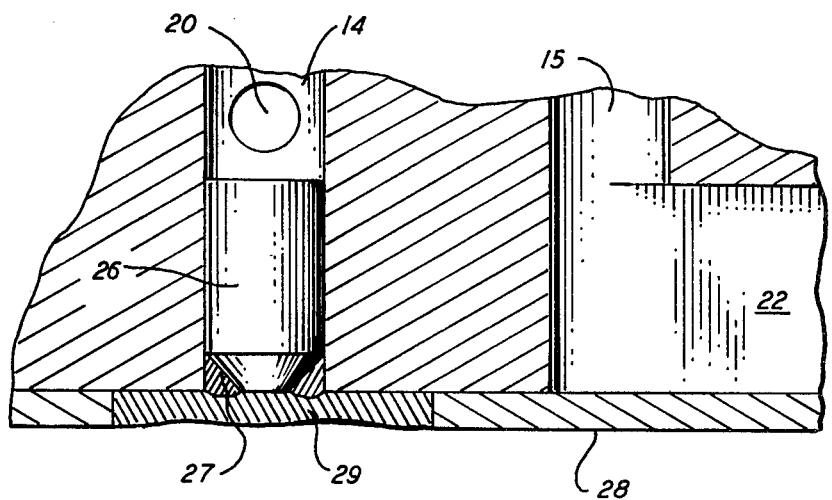
FIG. 5 is a mid cross-section along the width of the platen, showing the welds.

The disadvantages of the prior art are overcome by the use of plugs and small plates (individual zone plates). As illustrated by FIGS. 4 and 5, plug 26 is inserted in the end of the heat exchange channel 14 and in the end of the channel 18 at the other side of the platen 11. These plugs typically ¾ inch in length and having a beveled outer surface are then welded to the platen with a weld 27. A small end plate 28 is then placed over the four remaining channels in the zone and welded in place. When this step is finished one will have, along each edge of the platen a number of end plates 28 with welded plugs 26 in between. The final step is to form a fillet weld 29 covering the welded plug 26 and joining the two adjacent end plates. It is essential that the plug be welded first before the adjacent end plates 28 are welded with fillet weld 29.

With respect to the spacing of the milled connecting channel 22 from any other holes such as the vent passage 13, it is believed that the minimum distance therebetween is approximately 0.490 inches in a plate of the size described, i.e., a plate which is one and three quarter (1¾″) thick.

The plugs 26 and end plates 28 must be of the same material as the platen itself. As noted above, such platens are normally made of aluminum, more specifically, an aluminum alloy. The plugs and plates then must be made of the same alloy.

What is claimed is:

1. A platen comprising:
   a plate member having a plurality of fluid flow zones defined by a plurality of heat exchange channels extending across the width of the plate member, each of said fluid flow zones having an inflow pipe in communication with a first heat exchange channel in said fluid flow zone and an outflow pipe in communication with a last heat exchange channel in said fluid flow zone, and a plurality of connecting channels alternately disposed on each side of said plate member and in communication with adjacent heat exchange channels within each fluid flow zone; and
   a pair of separate sealing means for sealing each of said plurality of fluid flow zones, so that each pair of said separate sealing means seals only one fluid flow zone.

2. The platen of claim 1 wherein said pair of sealing means for sealing each of said plurality of fluid flow zones comprises a pair of end plates welded on opposite sides of said plate member, so that the heat exchange channels of a zone are sealed by said pair of end plates.

3. The platen of claim 1 wherein each of said pair of sealing means for sealing each said plurality of fluid flow zones comprises:
   a first plug inserted in one side of the first heat exchange channel;
   a second plug inserted in the last heat exchange channel and on a side opposite said first plug;
   a first end plate disposed on the same side of said plate member as said first plug and connected to said plate member to seal all but said first heat exchange channel; and
   a second end plate disposed on the same side of said plate member as said second plug and connected to said plate member to seal all but said last heat exchange channel.

4. The platen of claim 3 wherein said first and second plugs are beveled.

5. The platen of claim 3 wherein said first and second plugs are welded to said plate member.

6. The platen of claim 3 wherein said first and second end plates are welded to said plate member.

7. The platen of claim 5 wherein each of said end plates in each pair of means for sealing is welded to an adjacent end plate of an adjacent paired means for sealing with a fillet weld, said fillet weld extending over the plug between the adjacent end plate members.

8. A platen comprising a plate member having a plurality of fluid flow zones defined by a plurality of heat exchange channels extending across the width of the plate member, each of said fluid flow zones having an inflow pipe in communication with a first heat exchange channel in said zone and an outflow pipe in communication with a last heat exchange channel in said zone, a plurality of vented openings of predetermined depth disposed on a surface of said plate member; and a plurality of connecting channels disposed on the sides of said plate member each of milled connecting channel placing a heat exchange channels within a fluid flow zone in communication with an adjacent heat exchange channel within the same fluid flow zone, and each of said connecting channels disposed at a distance from any of said vented openings which is no less than a minimum distance from a heat exchange channel to a vented opening; and
   means for sealing the fluid flow zones.

9. A platen according to claim 8 wherein said plate member has said vented openings disposed on a plurality of staggered rows, said plate member having a plurality of substantially parallel vent passages disposed in a plane parallel to said heat exchange channels and each of said vent passages being in communication with the vented openings in a row, and each of said connecting channels being disposed so that the distance from a said connecting channel to the nearest vent passage is at least as great as the distance from a vent passage to the nearest heat exchange channel.

10. A platen according to claim 9 wherein the minimum distance between said milled connecting channel and said vent passage is approximately 0.490 inches.

11. A platen according to claim 8 wherein said means for sealing comprise a pair of separate sealing means for sealing each of said plurality of fluid flow zones, so that each pair of said separate sealing means seals only one fluid flow zone.

12. The platen of claim 11 wherein said pair of sealing means for sealing each of said plurality of fluid flow zones comprises a pair of end plates welded on opposite sides of said plate member, so that the heat exchange channels of a zone are sealed by said pair of end plates.

13. The platen of claim 12 wherein each of said pair of sealing means for sealing each said plurality of fluid flow zones comprises:
   a first plug inserted in one side of the first heat exchange channel;
   a second plug inserted in the last heat exchange channel and on a side opposite said first plug;
   a first end plate disposed on the same side of said plate member as said first plug and connected to said plate member to seal all but said first heat exchange channel; and
   a second end plate disposed on the same side of said plate member as said second plug and connected to said plate member to seal all but said last heat exchange channel.

14. The platen of claim 13 wherein said first and second plugs are welded to said plate member.

15. The platen of claim 13 wherein said first and second end plates are welded to said plate member.

16. The platen of claim 13 wherein said first and second plugs are welded to said plate member.

17. The platen of claim 16 wherein each of said end plates in each pair of means for sealing is welded to an adjacent end plate of an adjacent paired means for sealing with a fillet weld, said fillet weld extending over the plug between the adjacent end plate members.

* * * * *